United States Patent [19]
Stritzl et al.

[11] Patent Number: 6,000,392
[45] Date of Patent: Dec. 14, 1999

[54] STEAMER GAS OVEN

[75] Inventors: Josef Stritzl, Woodbridge; Alexander Abidor, Richmond Hill, both of Canada

[73] Assignee: Crown Food Service Equipment Ltd., Downsview, Canada

[21] Appl. No.: 09/114,892

[22] Filed: Jul. 14, 1998

Related U.S. Application Data

[60] Provisional application No. 60/052,916, Jul. 15, 1997.

[51] Int. Cl.[6] .............................. F22B 7/00; F22B 37/26; A47J 27/04
[52] U.S. Cl. ................... 126/369.2; 126/369; 126/20.1; 126/360 R
[58] Field of Search ........................... 126/20, 20.1, 369, 126/369.2, 110 R, 377, 360 R

[56] References Cited

U.S. PATENT DOCUMENTS

| | | |
|---|---|---|
| 113,241 | 4/1871 | Ashcroft . |
| 762,590 | 6/1904 | Lawrence . |
| 1,226,044 | 5/1917 | Wilson . |
| 2,444,587 | 7/1948 | Young et al. . |
| 2,666,427 | 1/1954 | Keating ............................ 126/360 R |
| 3,186,402 | 6/1965 | File .................................... 126/360 R |
| 3,820,524 | 6/1974 | Buckell .................................. 126/20 |
| 4,281,636 | 8/1981 | Vegh et al. .............................. 126/369 |
| 4,460,822 | 7/1984 | Alden et al. .............................. 126/20 |
| 4,495,932 | 1/1985 | Bratton ..................................... 126/20 |
| 4,552,123 | 11/1985 | Birkner et al. .......................... 126/369 |
| 4,817,582 | 4/1989 | Oslin et al. ................................ 126/20 |
| 5,103,800 | 4/1992 | Bedford et al. ........................... 126/20 |
| 5,178,125 | 1/1993 | Kuen ......................................... 126/20 |
| 5,549,038 | 8/1996 | Kolvites .................................... 126/20 |
| 5,617,839 | 4/1997 | Jennings et al. ......................... 126/20 |
| 5,640,946 | 6/1997 | Oslin ......................................... 126/20 |
| 5,732,614 | 3/1998 | Oslin ......................................... 126/20 |

*Primary Examiner*—Ira S. Lazarus
*Assistant Examiner*—Sara Clarke
*Attorney, Agent, or Firm*—Jane Parsons

[57] ABSTRACT

A gas powered, pressureless steam cooker has a connector tube for ingress of steam into the cooking compartment so that entry of a low temperature, wet steam can be minimized. The connector tube has a small diameter to constrain the entry of steam into the cooker compartment until it has reached a minimum velocity. A water reservoir is located alongside the oven compartment to the rear of the cooker and an integrated heat exchange tube and firebox are located in the tank. This tube is generally U-shaped, a lower horizontal leg opening at a mouth outside the water reservoir. An inshot burner fires into the lower horizontal leg and combustion gas flow through the U tube giving up heat to water in the reservoir. Additional heat exchange surface may be provided by channels through an upper leg of the U-tube from side to side. Flow of combustion gases may be optimized by the shape of the U-tube and at least a deflecting surface between a vertical web of the U and the upper leg of the U.

9 Claims, 4 Drawing Sheets

STEAMER GAS OVEN

This application claims the benefit of U.S. Provisional Application Ser. No. 60/052,916, filed Jul. 15, 1997.

BACKGROUND OF THE INVENTION

1. Field of the Invention

This invention relates to a gas powered pressureless steam cooker, especially to a gas powered steamer for commercial or restaurant use. The term "pressureless steam cooker" is intended to mean a steam cooker in which no great pressure of steam is developed although minor pressure of say ½ lb. per square inch may be permissible.

2. Acknowledgement of Prior Art

Steam cookers conventionally cook foods by the use of hot steam and may be powered by a steam generator which is either gas fired or electrical fired. No electric heating elements are present in the cooking compartment itself. For gas fired units, there has always been an ongoing problem in providing steam at a suitable temperature inside the cooking compartment without the loss of efficiency, e.g. heat in delivering the steam to the cooking compartment. For pressureless steam cookers steam is generally supplied into the cooking compartment through an open vent thus allowing ingress of wet steam at low temperatures.

The common design of a steam generator, or heat exchanger, up to today utilizes an atmospheric burner heating the outside of a steam generator. Atmospheric style burners are generally larger and have low efficiency due to their operating characteristics of burning in the open atmosphere. Usually such steam generators are located below the oven compartment but in some cases oven compartments are side-by-side with steam generators.

Examples of steam ovens are shown in:

| | | |
|---|---|---|
| U.S. Pat. No. 4,281,636 | Vegh et al. | Aug. 4, 1981 |
| U.S. Pat. No. 4,552,123 | Birkner | Nov. 12, 1985 |
| U.S. Pat. No. 3,820,524 | Buckell | June 28, 1974 |
| U.S. Pat. No. 4,460,822 | Alden et al. | July 17, 1984 |
| U.S. Pat. No. 5,549,038 | Kolvites | Aug. 27, 1996 |
| U.S. Pat. No. 5,732,614 | Oslin | Mar. 31, 1998 |
| U.S. Pat. No. 762,590 | Lawrence | June 14, 1904 |
| U.S. Pat. No. 1,226,044 | Wilson | May 15, 1917 |
| U.S. Pat. No. 113,241 | Ashcroft | April 4, 1871 |
| U.S. Pat. No. 2,444,587 | Young et al. | July 6, 1948 |
| U.S. Pat. No. 5,178,125 | Kuen | Jan. 12, 1993 |

SUMMARY OF THE INVENTION

The present inventors have addressed the problem of providing a more efficient gas powered steam generator, by combining the use of the latest burner technology and by the use of an innovative heat exchanger.

According to the invention there is provided a gas powered pressureless steamer cooker comprising at least one cooking compartment having at least one steam inlet for steam to enter the compartment for cooking, a steam generator which is located immediately adjacent to said cooking compartment in side-by-side relation therewith, the steam generator comprising at least one integrated heat exchanger tube and firebox within a water reservoir, the tube opening in a generally vertical mouth, an inshot gas burner directed into said mouth, means for supplying gas to said burner, the integrated heat exchanger tube and fire box being in heat exchange relationship with water within the water reservoir to create steam from water, the reservoir having an outlet for steam, connector means between said outlet and said steam inlet of said cooking compartment characterized in that said connector means is constrained to direct the supply of steam therethrough; and in that said heat exchange tube comprises a U-shaped tube having a lower horizontal leg, an upper horizontal leg and a vertical web, said vertical mouth being located at a distal end of the lower leg. The heat exchanger creates steam in the steam generator and delivers it through the connection means from the outlet to the inlet of the cooking compartment.

Conveniently for each cooking compartment a pair of inshot burners are provided, each one directed into a mouth of a respective lower leg of a pair of parallel heat exchanger U-tubes.

Utilizing the inshot burner, the flame is directed into the parallel U-tube exchangers and resulting hot gases flow through the tubes, the surfaces of which are heat exchange surfaces with the water reservoir. Of course, one, or more than two U-tubes may be used if desired. An inshot burner is provided for each heat exchange tube. The heat exchangers are completely immersed in water inside the reservoir, any convenient level control means being provided to maintain the level of water. Steam is injected into the cooking compartment through a steam inlet tube as the connector means.

The U-tube heat exchangers are important in the provision of a steam oven which may have significant advantages in efficiency. Preferably for each U-tube heat exchanger, the lower leg is of square section tube having rounded corners and has a cross section of a size to enhance oxygen/air flow into the tube for utilization by the inshot burner. It is, of course, possible to use tubes with other cross section. Any longitudinal weld in the lower leg may conventionally be along an upper surface. This lower leg of the heat exchanger tube is effectively a firebox for the inshot burner and its dimensions and shape are selected to enhance operation of the burner while allowing the flow of the combustion gases into the upper part of the heat exchanger tube.

Preferably, for each U-tube heat exchanger the upper leg may be of rectangular section tube having a height greater than the width and less than the length of the tube. The ratio of the height of the upper leg of the tube to the length of the upper leg of the tube may be generally about 1:4 and preferably about 1:2. In an extreme case the height and the length may be equal. It may, of course, be more or less than this.

The height of the upper leg of the tube should be at least sufficient to allow for the presence of channels from side to side of the leg without interfering unduly with the flow of hot gases in the tube.

Preferably at least two cylindrical or other shaped channels are provided to supply additional heat exchange surface and to act as a stay between the sides of the upper leg of the heat exchanger tube. It is believed that the use of a hollow stay may provided significant advantages over conventional solid stays. This is due to the fact that more heat exchange surface is provided.

The web of the U tube may be generally vertical and it may be advantageous to provide an angled deflection surface for hot gases at the top corner where the web meets the upper leg. Such deflection surface may be angled at roughly 45° to each of the upper leg and web although any angle will provide some benefit. A general range of suitable angles is from 30° to 60°. The deflection surface may help to reduce gas turbulence in the corner and direct the flow of gas smoothly around the U.

The U-tube heat exchangers should be spaced from the bottom of the steam generator tank to avoid build up of lime scale between the tank bottom and the U-tube.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
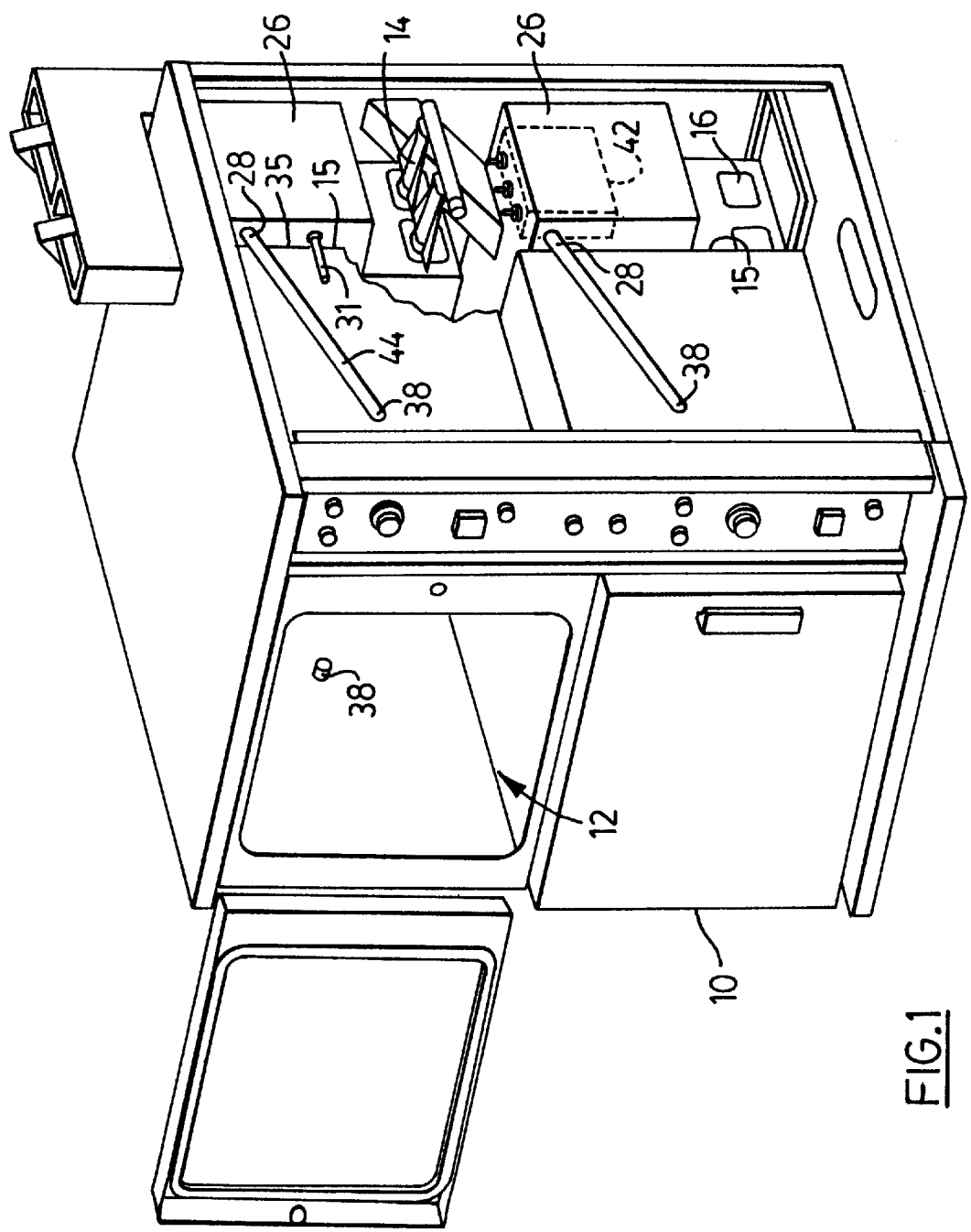
FIG. 1 shows a general view of a two compartment steam cooker.

FIG. 1 shows a general view of a two compartment steamer 10, each compartment 12 having steam inlets 38 and being supplied with steam from the steam generator 26 comprising an integrated heat exchange tube/firebox 18 (see FIG. 2) and a water reservoir 27. A one compartment unit is also possible.

The gas burner 14 of the exemplified embodiment is an inshot burner type of any convenient type. For example, they may be gas burner nozzles in accordance with those described and claimed in U.S. Pat. No. 5,186,620 issued Feb. 16, 1993 to Hollingshead and assigned to Beckett Gas Inc. The inshot gas burner 14 is a relatively small unit in comparison to the BTU/HR output. The gas and primary air is mixed at the beginning of the burner inlet. When the flame exits at the end of the burner tube, it is mixed with secondary air to form an extremely hot flame cone.

Figure 2:
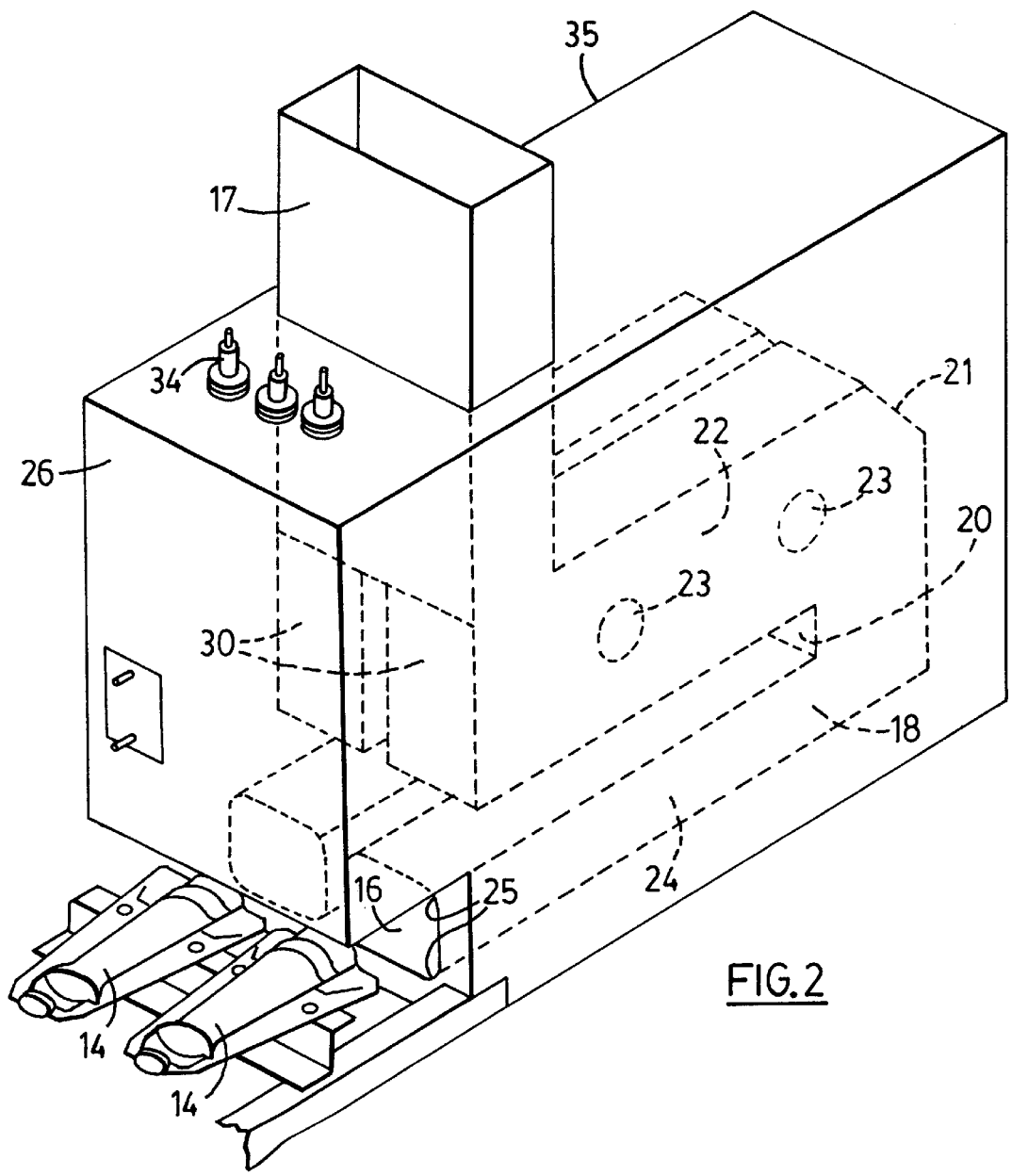
FIG. 2 is a isometric view showing the steam generator for one of the compartments of FIG. 1.
Figure 3:
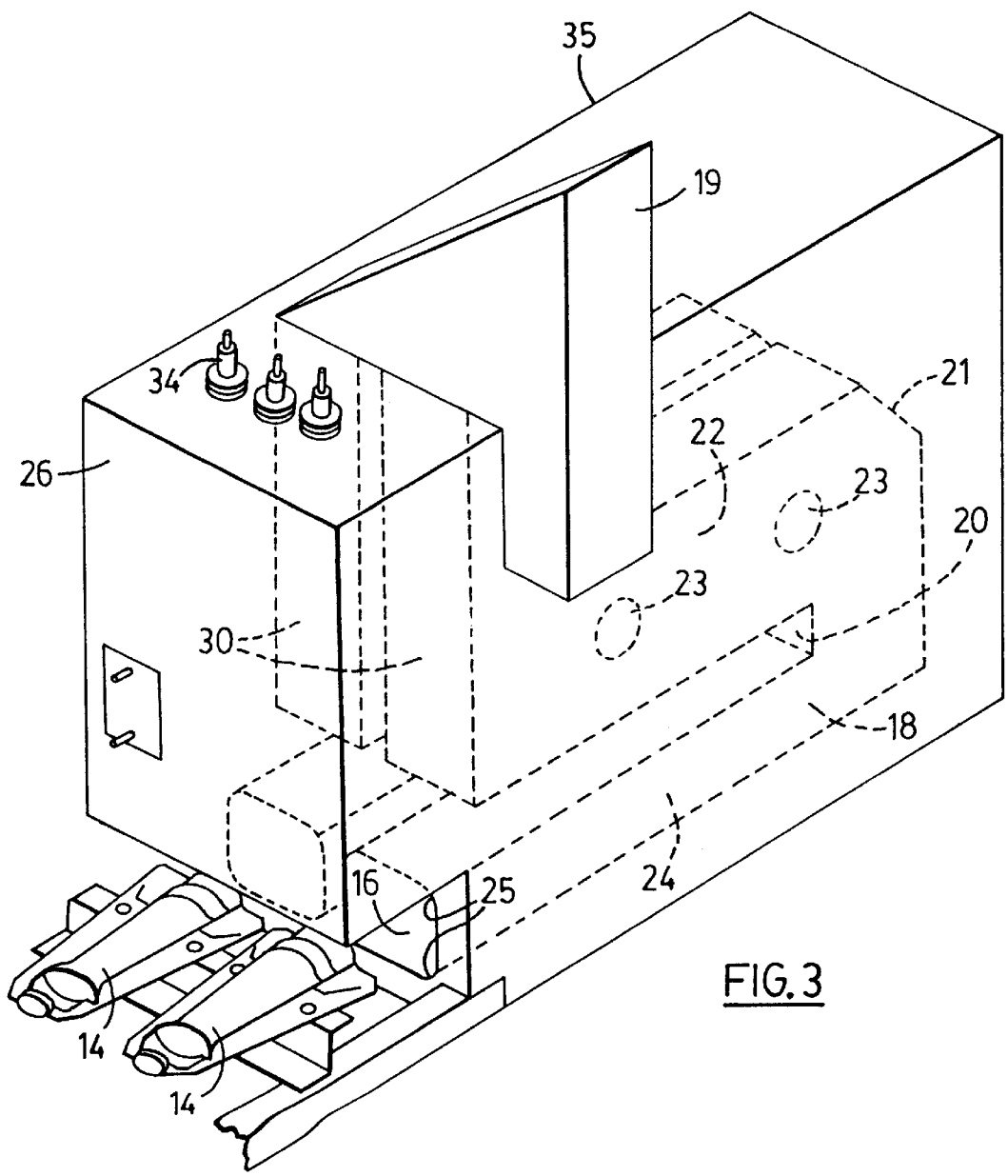
FIG. 3 is an isometric view of an alternate steam generator.
Figure 4:
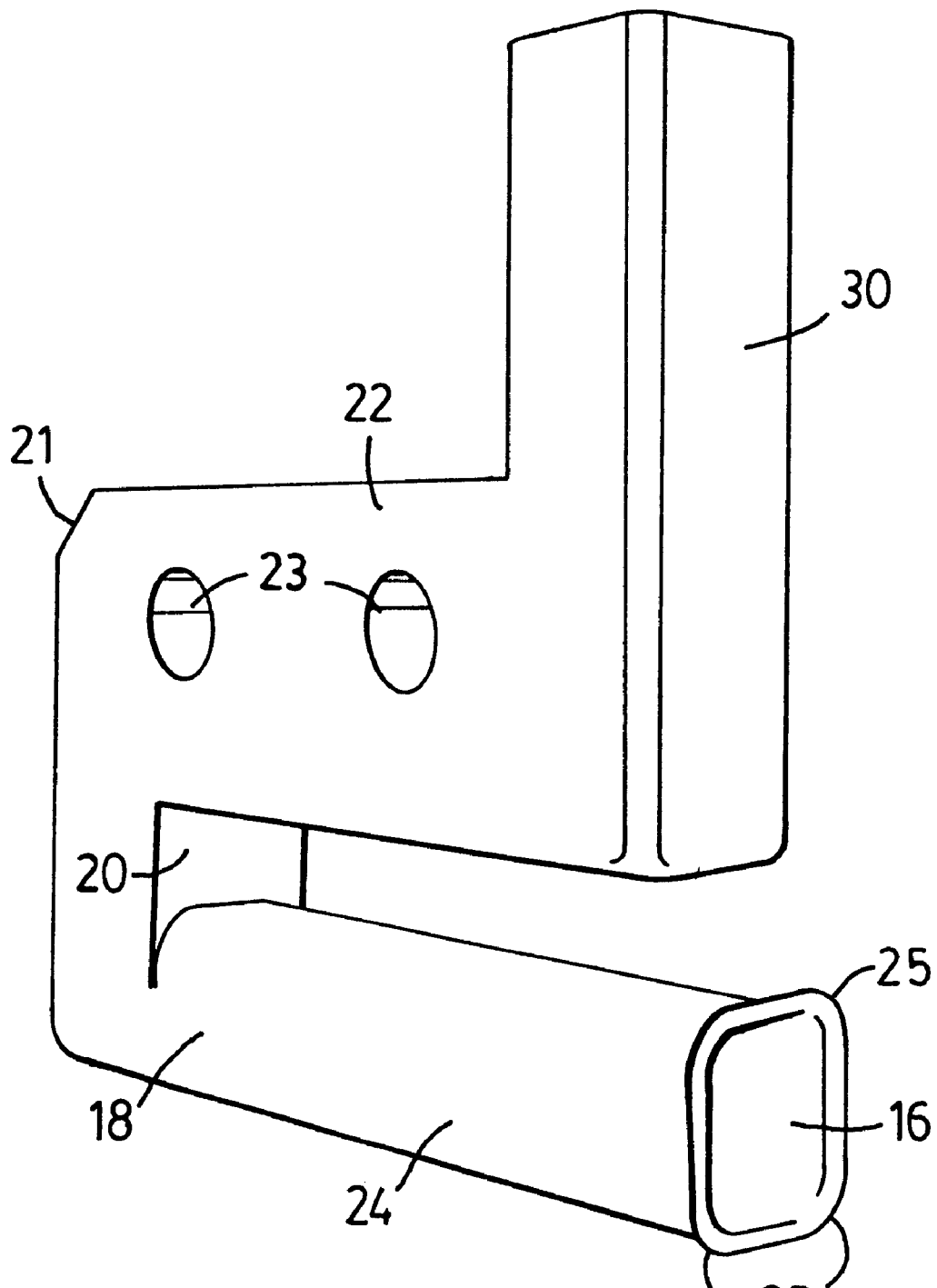
FIG. 4 is an isometric view of one of the heat exchange tubes of the steam generators of FIGS. 2 and 3.

As shown in FIGS. 2 and 3, for each cooking compartment 12 a pair of inshot burners 14 are directed into mouths 16 of U-tubes 18 having their webs 20 parallel and vertical, and horizontal upper legs 22 parallel with horizontal lower legs 24. Mouths 16 are located at the distal ends of lower legs 24.

The lower legs 24 are each formed of stainless steel tube of approximately square section. The tube is formed by bending plate into the desired shape to have rounded corners 25. A weld 29 is provided along the top surface. These lower legs not only form part of the heat exchanger but also act as fire box tube for the inshot burners.

The upper legs 22 are deep in comparison with their width. Indeed, as shown, the height of upper leg 22 is approximately ½ its length. Two cylindrical channels 23 pass through upper leg 22 from side to side as stays between the sides to increase the heat exchange surface. While two cylindrical channels 23 are shown more or less channels are possible. These channels should not interfere unduly with flow of gas inside the U-tube. It may be suitable that the diameter of the channels be approximately ½ the height of upper leg 22.

The webs 20 of the U-tubes are roughly vertical and deflecting wall 21 are provided at an upper corner to deflect gas flow into upper legs 22. The angle of deflecting wall 21 may be about 45°.

The orientation of U-tubes 18 is also important. U-tubes 18 should each be spaced from the bottom of steam generator tank 26 to minimize build up of lime scale. The spacing may conveniently be about from ¾ inch to 1½ inch although greater or even lesser spacings are possible. The spacing is maintained by welding the lower leg 24 of the tube 18 to the wall of the steam generator tank in its mouth area and by welding the exhaust flue 17 (FIG. 2), 19 (FIG. 3) to the tank where it exits.

FIGS. 2 and 3 differ from one another only in the arrangement of the flue exhaust outlets. FIG. 2 shows a top exhaust 17 and FIG. 3 shows the exhaust 19 at a side 15 of the steam generator tank 26.

Each pair of tubes 18 is arranged within a water/steam tank 26 having an inlet 31 for water. The tank 26 and an outlet 28 for steam are also provided with at least one probe 34 to indicate internal water level. The outlet 28 is connected to inlet 38 through a short length of tube 44. The tube 44 has a small diameter to somewhat check free flow of steam into oven compartment 12. Such constraint tends to retain very wet low temperature steam in the steam generator 26 until it has sufficient velocity built up to pass through the tube 44. Preferably the tube 44 has a diameter of ⅜ of an inch but diameters of ¼ of an inch to ½ an inch are acceptable and diameters outside this range are possible for some sizes of steam generators and ovens.

To curb the flow of steam even further, a nozzle may be provided to jet steam into the oven compartment. It should be remembered that the steamer cooker is essentially a pressureless cooker and therefore the nozzle must not be so constricting that there is undue build up of pressure. Approximately half a pound of pressure may be admissible but more involves changes in cooking technique. Therefore the choice of diameter of nozzle is dependent on the pressure build up. For example, a suitable nozzle diameter might be 7/32 of an inch plus or minus ⅛ an inch. Suitably the nozzle may have four orifices and there are two nozzles (and tubes 44) per oven compartment.

The proper amount of dry steam require for cooking is generated by the large heat transfer area of each U-tube 18 heat exchanger. This heat transfer is represented by all vertical and horizontal areas in the U-tube. Flames from burner 14 are directed into horizontal lower leg 24 through tube opening 16. The end of the flame and hot gases continue their way through the integrated vertical web 20 and then these gases enter the upper leg 22 of the heat exchanger, and continue through the extension of the main chamber in a vertical or angular direction into the flue exhaust outlet 17 (see FIG. 2) or 19 (see FIG. 3). It is believed that utilizing the inshot burners, a high efficient, compact boiler producing dry steam may be attained. This generator 26, being adjacent to the cooking cavity 12 and the immediate ingress of steam into the chamber 12, that the temperature for the dry steam is maintained at generally 212° F.

The side 35 of tank 26 is flush with and juxtaposed against a back surface 15 of cooking compartment 12 so that the length of tubes 44 is minimized. Inshot burners 14 are directed into the mouths of lower legs 24 of heat exchanger tubes 18 from the side allowing easy access for maintenance and economic use of space. It is believed that by utilizing the efficacy of inshot burner nozzles 14, the arrangement of U-shaped heating tubes for said nozzles having vertically arranged webs, and the immediate ingress of steam into the cooking compartment 12, benefits may be provided.

The water level in this generator is controlled by probes 34. These are protected from turbulence by using a special stainless steel box 42 in which all probes are enclosed.

We claim:

1. A gas powered pressureless steamer cooker comprising at least one cooking compartment having at least one steam inlet for steam to enter the compartment for cooking, a steam generator which is located immediately adjacent to said cooking compartment in side-by-side relation therewith, the steam generator comprising at least one burner and at least one integrated heat exchanger tube and firebox within a water reservoir, the tube opening in a generally vertical mouth, an inshot gas burner directed into said mouth, means for supplying gas to said burner, the integrated heat exchanger tube and firebox being in heat exchange relationship with water within the water reservoir to create steam from water, the reservoir having an outlet for steam, connector means between said outlet and said steam inlet of said cooking compartment characterized in that:

said connector means is constrained to direct the supply of steam therethrough to provide pressure of not more than ½ lb.;

said heat exchanger tube comprises at least one U-shaped tube having a lower horizontal leg, an upper horizontal leg and a vertical web spacing the lower horizontal leg below the upper horizontal leg whereby all vertical and horizontal areas of the U shaped tube are available for direct heat transfer with water in said water reservoir; and said vertical mouth being located at a distal end of the lower leg.

2. A gas powered pressureless steam cooker as claimed in claim 1 in which the connector means is at least one tube having a diameter of from ¼ of an inch to ½ of an inch.

3. A gas powered pressureless steamer cooker as claimed in claim 1 in which the lower leg of U-shaped tube is formed of square section tube with rounded corners.

4. A gas powered pressureless steamer cooker as claimed in claim 1 in which the upper horizontal leg has a height to length ratio of from 1:1 to 1:4.

5. A gas powered pressureless steamer cooker as claimed in claim 4 in which said height to length ratio is generally 1:2.

6. A gas powered pressureless steamer cooker as claimed in claim 4 in which at least one horizontal channel passes through upper horizontal leg from side to side orthogonal to its axis.

7. A gas powered pressureless steamer cooker as claimed in claim 1 in which a gas deflecting surface is provided between the web and upper horizontal leg to direct gases in the tube into the upper horizontal leg.

8. A gas powered pressureless steamer cooker as claimed in claim 7 in which the deflecting surface is oriented at 45° to the web and the upper horizontal leg.

9. A gas powered pressureless steamer cooker as claimed in claim 1 in which the U-shaped heat exchanger tube is spaced above the bottom of water reservoir.

* * * * *